United States Patent [19]

Westling

[11] 4,088,249
[45] May 9, 1978

[54] LIQUID DISPENSING MACHINE
[76] Inventor: Donald E. Westling, c/o Tilleys Pizza House, 902 4th St., Beloit, Wis. 53511
[21] Appl. No.: 733,248
[22] Filed: Oct. 18, 1976
[51] Int. Cl.² ............................................. B67D 3/00
[52] U.S. Cl. ..................................... 222/486; 141/104
[58] Field of Search ..................... 222/144.5, 482, 486; 251/5; 99/450.4, 450.3, 450.6, 450.1; 239/562; 141/104, 242, 243, 244

[56] References Cited
U.S. PATENT DOCUMENTS

| 1,202,439 | 10/1916 | Scott | 141/242 X |
| 3,447,576 | 6/1969 | Grönlund | 251/5 X |
| 3,545,386 | 12/1970 | Westling | 107/1 |

Primary Examiner—Robert B. Reeves
Assistant Examiner—John P. Shannon
Attorney, Agent, or Firm—Leydig, Voit, Osann, Mayer & Holt, Ltd.

[57] ABSTRACT

Pizza sauce is contained in a vat and is deposited onto a pizza through resiliently flexible tubes having upper end portions leading from the vat and having intermediate portions disposed in a pressure chamber. When the chamber is pressurized, the intermediate portions of the tubes are squeezed closed and hold the sauce in the upper portions of the tubes. Upon de-pressurization of the chamber, the intermediate portions of the tubes automatically flex open and allow the sauce to flow out of the tubes and onto the pizza. Different ones of the tubes may be selectively permitted to flex open so as to enable the sauce to be discharged in patterns of different diameters.

1 Claim, 4 Drawing Figures

LIQUID DISPENSING MACHINE

BACKGROUND OF THE INVENTION

This invention relates to a machine for dispensing liqud such as pizza sauce and the like onto pizzas prior to baking of the latter. One example of a pizza sauce dispensing machine is disclosed in Westling U.S. Pat. No. 3,545,386.

SUMMARY OF THE INVENTION

The general aim of the present invention is to provide a new and improved sauce dispensing machine which is of relatively simple and trouble-free construction and which can be readily used to dispense sauce in appropriately sized patterns of pizzas of different diameters.

A further object is to provide a machine adapted to dispense the sauce from a container and through resiliently flexible tubes having intermediate portions disposed in a pressure chamber. When the chamber is pressurized, the intermediate portions of the tubes are squeezed together to hold the sauce in the tubes. Momentary release of the pressure in the chamber causes the tubes to flex open and dispense charges of sauce onto the pizza.

Another object is to provide a machine of the foregoing type in which at least two annular rows of tubes are controlled by two separate pressure chambers. When the pressure in both chambers is released, the sauce in the tubes of both rows may be discharged onto a large pizza. By releasing the pressure in only one of the chambers, only the sauce in one row of tubes is discharged and may be deposited onto a smaller pizza.

DETAILED DESCRIPTION OF THE PREFERRED EMBODIMENT

Figure 1:
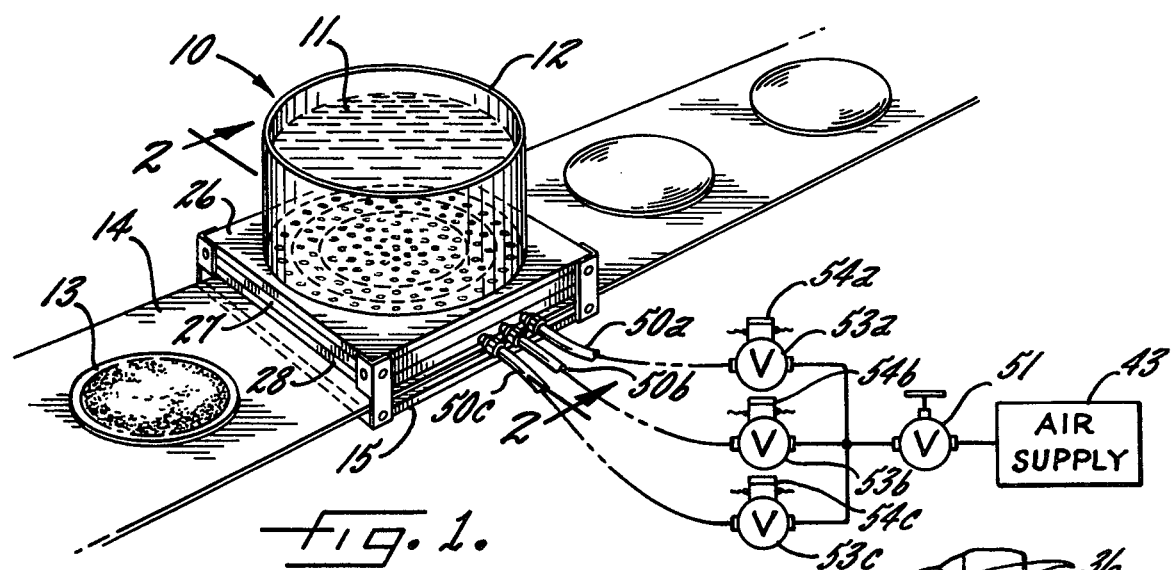
FIG. 1 is a fragmentary perspective view showing pizzas being conveyed beneath a new and improved sauce dispensing machine incorporating the unique features of the present invention.

As shown in the drawings for purposes of illustration, the invention is embodied in a machine 10 for dispensing liquid sauce 11 from a container or vat 12 onto a pizza 13 or the like before the pizza is placed in an oven and baked. The pizzas may be delivered to the machine manually or fed one-by-one to the machine along an intermittently movable conveyor 14 as shown in FIG. 1.

The machine 10 includes a frame 15 disposed adjacent the conveyor 14 and supporting the vat 12. Herein, the vat is in the form of a cylindrical sleeve having an open bottom.

In accordance with the present invention, the flow of sauce from the vat 12 is controlled in a unique and simple manner by providing resiliently flexible tubes 20 (FIG. 2) having upper end portions 21 communicating with the vat 12 and having intermediate portions 23 disposed within a pressure chamber 24. When the chamber is pressurized by air or other fluid, the intermediate portions 23 of the tubes 20 are squeezed together so as to seal off the tubes and retain the sauce in the upper end portions 21 of the tubes. When the pressure is released from the chamber 24, the intermediate portions 23 of the tubes flex open to permit the sauce in the upper end portions 21 of the tubes to flow to and out of the lower end portions 25 thereof.

More specifically, the pressure chamber 24 is defined by and within an enclosure which is formed by a top plate 26 (FIG. 2), a spacer plate 27 and a bottom plate 28. The top plate is welded to the bottom of the vat 12 and is formed with holes 30 whose upper ends communicate with the vat. The holes 30 extend through generally cylindrical nipples 31 which are formed by appropriately milling the underside of the top plate. Such nipples are fitted into the upper end portions 21 of the tubes 20, the latter being made of neoprene or the like and being sized to telescope tightly over the nipples.

Figure 2:
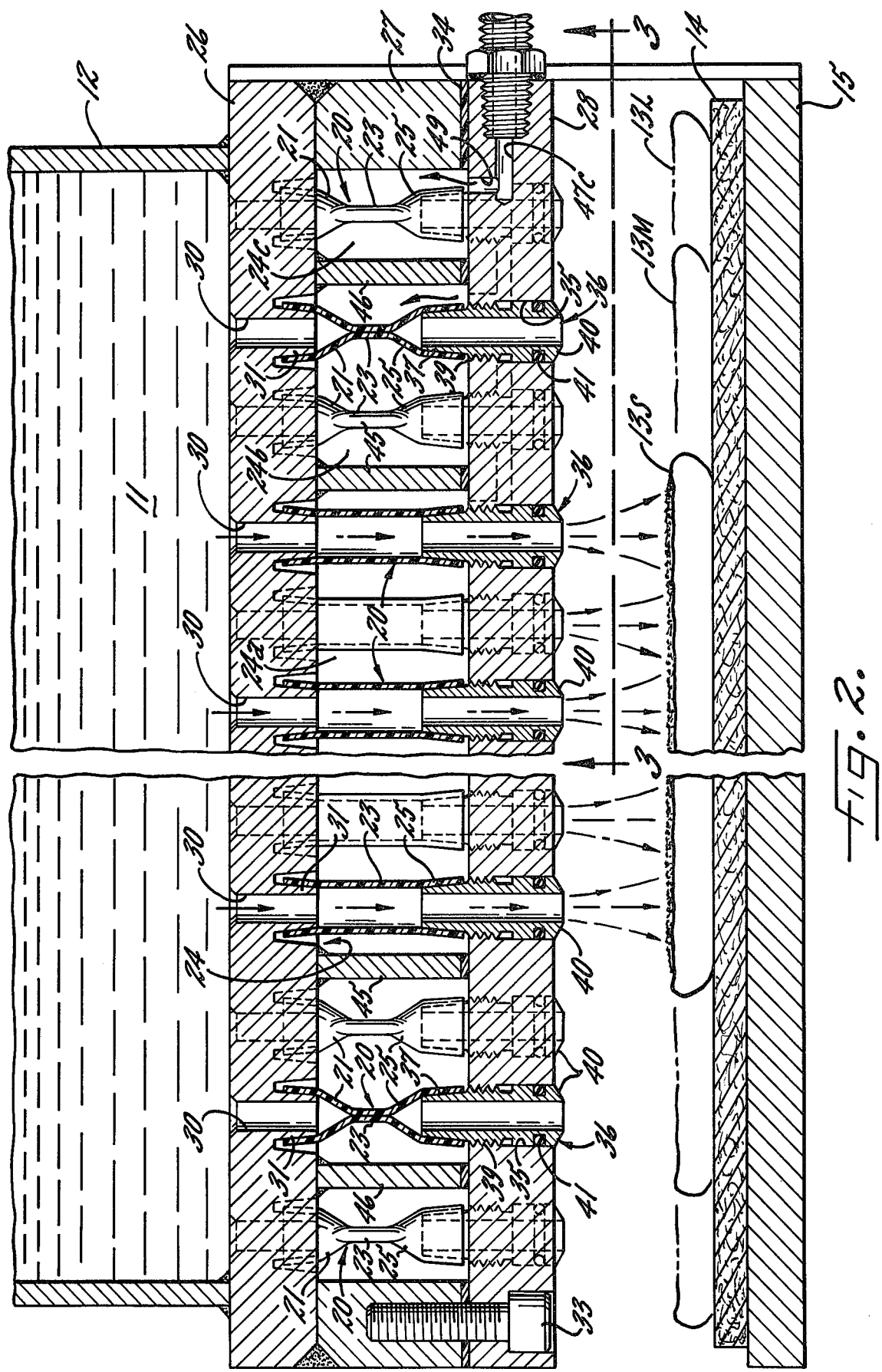
FIG. 2 is an enlarged fragmentary cross-section taken substantially along the line 2—2 of FIG. 1.

As shown in FIG. 2, the spacer plate 27 underlies and is welded to the outer margins of the upper plate 26 and is formed with a large central opening which defines the chamber 24 and which receives the intermediate portions 23 of the tubes 20. The bottom plate 28 is secured to the spacer plate 27 by cap screws 33 and is sealed tightly to the spacer plate by a gasket 34 disposed between the two plates.

Counterbored holes 35 (FIG. 2) are formed through the bottom plate 28 and are alined with the holes 30 in the top plate 26. Disposed within the holes 35 are tubular fittings 36 having upper nipples 37 onto which the lower end portions 25 of the tubes 20 are tightly telescoped. Each fitting 36 is threaded into the bottom plate 28 as indicated at 39 and is formed with a stainless steel head 40 which is sealed within the hole 35 by an O-ring 41.

With the foregoing arrangement, the chamber 24 is normally kept pressurized by air admitted into the chamber from a suitable pressure source 43 (FIG. 1). As long as pressurized air is in the chamber, the intermediate portion 23 of each tube 20 is held squeezed together as shown by the three left-hand tubes and the three right-hand tubes illustrated in FIG. 2 and thus the sauce is retained in the upper end portion 21 of the tube. When the pressure in the chamber 24 is momentarily released, the intermediate portions 23 of the tubes flex open automatically by virtue of their own resiliency (see the center tubes shown in FIG. 2) and thus allow the sauce to flow by gravity from the upper end portions 21 of the tubes to the lower end portions 25 thereof and then onto the pizza 13 through the heads 40. Pressurized air then may be re-admitted into the chamber 24 to squeeze the intermediate tube portions 23 closed and cut off the flow of sauce. Accordingly, the dispensing machine 10 operates effectively with very few moving elements and with virtually no chance of malfunctioning. Also, the quantity of sauce disposed from each tube can be regulated by controlling the time period during which the chamber 24 is de-pressurized.

Figure 3:
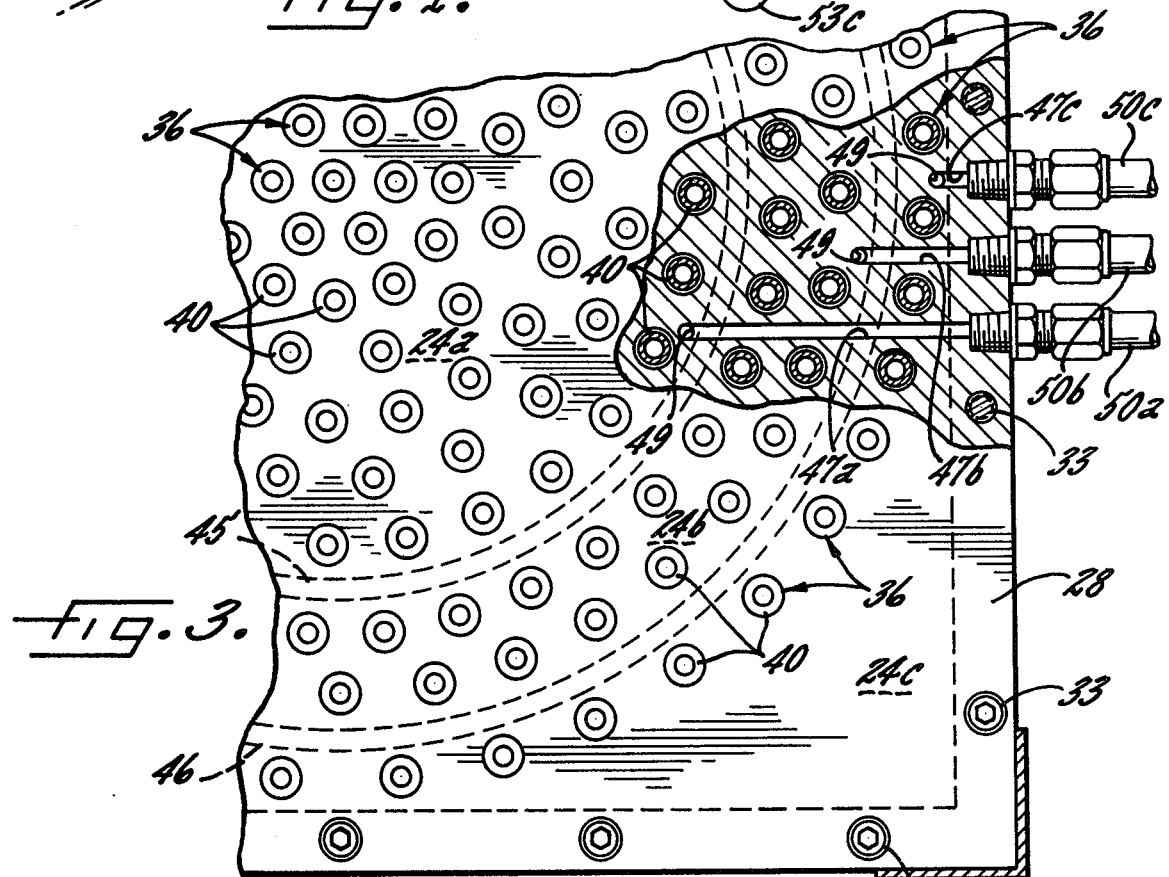
FIG. 3 is a fragmentary cross-section taken substantially along the line 3—3 of FIG. 2.

An important feature of the dispensing machine 10 is that it can be used to discharge sauce in patterns of different diameters so that pizzas of different sizes can be serviced by the machine. For this purpose, the chamber 24 is actually defined by three separate chambers, namely, an inner chamber 24a (FIG. 2), a middle chamber 24b and an outer chamber 24c. The inner chamber 24a is defined by that portion of the chamber 24 located inwardly of a circular enclosure ring 45 (FIGS. 2 and 3) sandwiched between and sealed to the top and bottom plates 26 and 28 disposed between the third and fourth rows of tubes 20, the numbering of the rows starting at the outside of the plates. The middle chamber 24b is defined between the ring 45 and a second enclosure ring 46 between the first and second rows of tubes while the outer chamber 24c is defined between the outer side of the ring 46 and the inner wall of the spacer plate 27.

Three horizontal passages 47a, 47b and 47c (FIG. 3) are drilled in the bottom plate 28 from one edge thereof with the passage 47a leading to the inner chamber 24a, the passage 47b leading to the middle chamber 24b and the passage 47c leading to the outer chamber 24c. A vertical hole 49 (FIG. 2) is formed through the bottom plate adjacent the inner end of each passage and establishes communication between the passage and the respective chamber.

Figure 4:
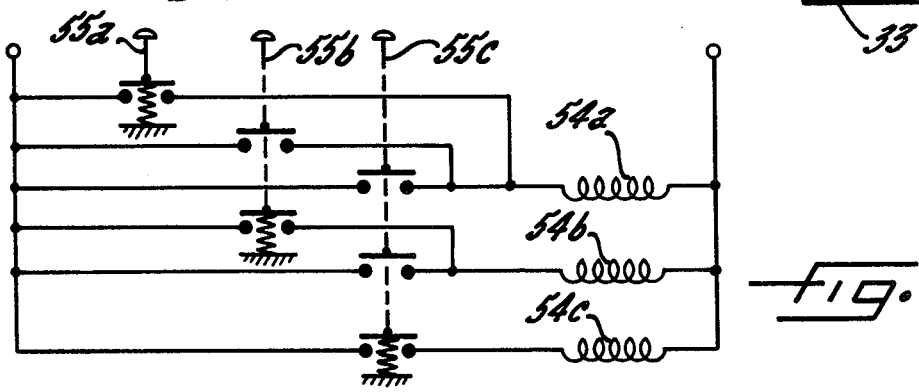
FIG. 4 is an electrical circuit diagram of the control for the machine.

Connected to the outer ends of the passages 47a, 47b and 47c are flexible hoses 50a, 50b and 50c (FIGS. 1 and 3), respectively, which communicate with the air source 43 by way of a main on-off valve 51 (FIG. 1). Disposed in the lines 50a, 50b and 50c are three-way valves 53a, 53b and 53c, respectively, having springs which normally position the valves so as to establish communication between the passages and the air source. When solenoids 54a, 54b and 54c are energized, the valves 53a, 53b and 53c are shifted to positions venting the passages to atmosphere. Depression of a push button switch 55a (FIG. 4) energizes only the solenoid 54a, depression of a switch 55b energizes the solenoids 54a and 54b and depression of a switch 55c results in energization of all three solenoids.

When the machine 10 is being used to apply sauce to a large pizza 13L (FIG. 2), the switch 55c is momentarily depressed to effect energization of all three solenoids 54a, 54b and 54c and thereby cause all three chambers 24a, 24b and 24c to be vented to atmosphere. As a result, all of the tubes 20 momentarily flex open and dispense sauce onto the pizza. If the machine 10 is operating on a medium pizza 13M, the switch 55b is momentarily depressed to vent the inner and middle chambers 24a and 24b while the outer chamber 24c is kept in a pressurized condition. Thus, the tubes 20 in the inner and middle chambers 24a and 24b flex open while the tubes in the outer chamber 24c remain closed so that the sauce is dispensed in a pattern of smaller diameter. When applying sauce to a small pizza 13S, the switch 55a is momentarily depressed and thus only the tubes in the inner chamber 24a flex open. Accordingly, the sauce is dispensed in a pattern of still smaller diameter. Thus, the present machine 10 can be easily controlled to dispense the sauce in the patterns of different diameters. The various switches can either be operated manually or automatically in timed relation with the advance of the pizzas.

I claim:

1. Apparatus for dispensing liquid sauce or the like, said apparatus comprising a container for said sauce, inner and outer annular rows of angularly spaced upright tubes having upper end portions communicating with the lower end of said container to receive said sauce and having lower end portions with open lower ends, said tubes being made of resiliently flexible material, a first enclosure defining an inner chamber receiving the intermediate portions of the tubes in said inner row, a second enclosure defining an outer chamber receiving the intermediate portions of the tubes in said outer row, said inner chamber being sealed from said outer chamber, means for admitting pressure fluid into said chambers to squeeze the intermediate portions of said tubes together to retain said sauce in the upper portions of said tubes, said means being selectively operable to release the pressure fluid from either both of said chambers or only from said inner chamber thereby to enable the intermediate portions of the tubes of both rows or the intermediate portions of only the tubes of said inner row to flex open and dispense said sauce.

* * * * *